(12) United States Patent
Anegawa

(10) Patent No.: US 11,602,880 B2
(45) Date of Patent: Mar. 14, 2023

(54) THREE-DIMENSIONAL SHAPING DEVICE AND INJECTION MOLDING DEVICE

(71) Applicant: SEIKO EPSON CORPORATION, Tokyo (JP)

(72) Inventor: Kenta Anegawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 140 days.

(21) Appl. No.: 17/005,975

(22) Filed: Aug. 28, 2020

(65) Prior Publication Data

US 2021/0060837 A1 Mar. 4, 2021

(30) Foreign Application Priority Data

Aug. 30, 2019 (JP) .............................. JP2019-157928

(51) Int. Cl.
*B29C 45/18* (2006.01)
*B29C 45/20* (2006.01)
*B29C 45/76* (2006.01)
*B29C 45/72* (2006.01)
*B29C 45/00* (2006.01)

(52) U.S. Cl.
CPC .............. *B29C 45/18* (2013.01); *B29C 45/20* (2013.01); *B29C 45/72* (2013.01); *B29C 45/76* (2013.01); *B29C 2045/0091* (2013.01); *B29C 2045/1891* (2013.01)

(58) Field of Classification Search
CPC ............ B29C 45/18; B29C 2045/1891; B29C 64/329
See application file for complete search history.

(56) References Cited

U.S. PATENT DOCUMENTS

| 8,430,230 B1 * | 4/2013 | Ferguson ................ B29C 31/02 406/28 |
| 2017/0008230 A1 * | 1/2017 | Yuyama ................ B29C 64/118 |
| 2017/0259337 A1 | 9/2017 | Furukawa |
| 2019/0061243 A1 | 2/2019 | Saito et al. |

FOREIGN PATENT DOCUMENTS

| CN | 104175508 | 12/2014 |
| CN | 109421269 | 3/2019 |
| JP | 2014-226904 | 12/2014 |
| JP | 2017-052129 A | 3/2017 |
| JP | 2019-038157 | 3/2019 |
| WO | 2015/129733 A | 9/2015 |
| WO | 2017/081813 A | 5/2017 |

\* cited by examiner

*Primary Examiner* — James Sanders
(74) *Attorney, Agent, or Firm* — Workman Nydegger

(57) ABSTRACT

A three-dimensional shaping device includes: a material storage unit and a mouth portion which is provided below the body portion and which has a hole with a diameter smaller than a maximum inner diameter of the body portion, a material supply unit configured to supply a material to the material storage unit, a melting unit configured to melt the material supplied through the mouth portion, a nozzle configured to discharge the shaping material toward a stage, a remaining state detection unit configured to detect a remaining state of the material, a remaining amount determination unit configured to determine whether a remaining amount of the material is less than a first reference value based on the remaining state, and a control unit configured to supply, when the remaining amount is less than the first reference value, the material to the material storage unit.

5 Claims, 9 Drawing Sheets

THREE-DIMENSIONAL SHAPING DEVICE AND INJECTION MOLDING DEVICE

The present application is based on, and claims priority from JP Application Serial Number 2019-157928, filed Aug. 30, 2019, the disclosure of which is hereby incorporated by reference herein in its entirety.

BACKGROUND

1. Technical Field

The present disclosure relates to a three-dimensional shaping device and an injection molding device.

2. Related Art

With respect to a three-dimensional shaping device, for example, WO 2015/129733 discloses a three-dimensional shaping device including an extrusion device that plasticizes, by an in-line screw which is a plasticization unit, a resin material in a form of pellet supplied from a hopper and discharges the plasticized resin from a nozzle.

As the three-dimensional shaping device disclosed in WO 2015/129733, when the material in the form of pellet is stored in the hopper and then the material is supplied from the hopper to the plasticization unit, due to a weight of the material itself stored in the hopper, there is a case where materials in the form of pellet interfere with each other to clog a vicinity of an exit of the hopper and cause a phenomenon called a bridge in which the material cannot be supplied to the plasticization unit.

SUMMARY

According to one aspect of the present disclosure, a three-dimensional shaping device is provided. The three-dimensional shaping device includes: a material storage unit including a cylindrical body portion and a mouth portion which is provided below the body portion and which has a hole with a diameter smaller than a maximum inner diameter of the body portion, and configured to store a material in a form of pellet; a material supply unit configured to supply the material to the body portion of the material storage unit; a melting unit configured to melt the material supplied through the mouth portion of the material storage unit to form a shaping material; a nozzle configured to discharge the shaping material toward a stage; a remaining state detection unit configured to detect a remaining state of the material stored in the material storage unit; a remaining amount determination unit configured to determine whether a remaining amount of the material stored in the material storage unit is less than a first reference value based on the remaining state; and a control unit configured to control, when the remaining amount is less than the first reference value, the material supply unit to supply the material to the material storage unit until the remaining amount is equal to or larger than the first reference value, in which the first reference value is determined as a value at which a height of the material stored in the material storage unit when the remaining amount is equal to the first reference value is less than a height of an upper end of the body portion.

DESCRIPTION OF EXEMPLARY EMBODIMENTS

A. First Embodiment

Figure 1:
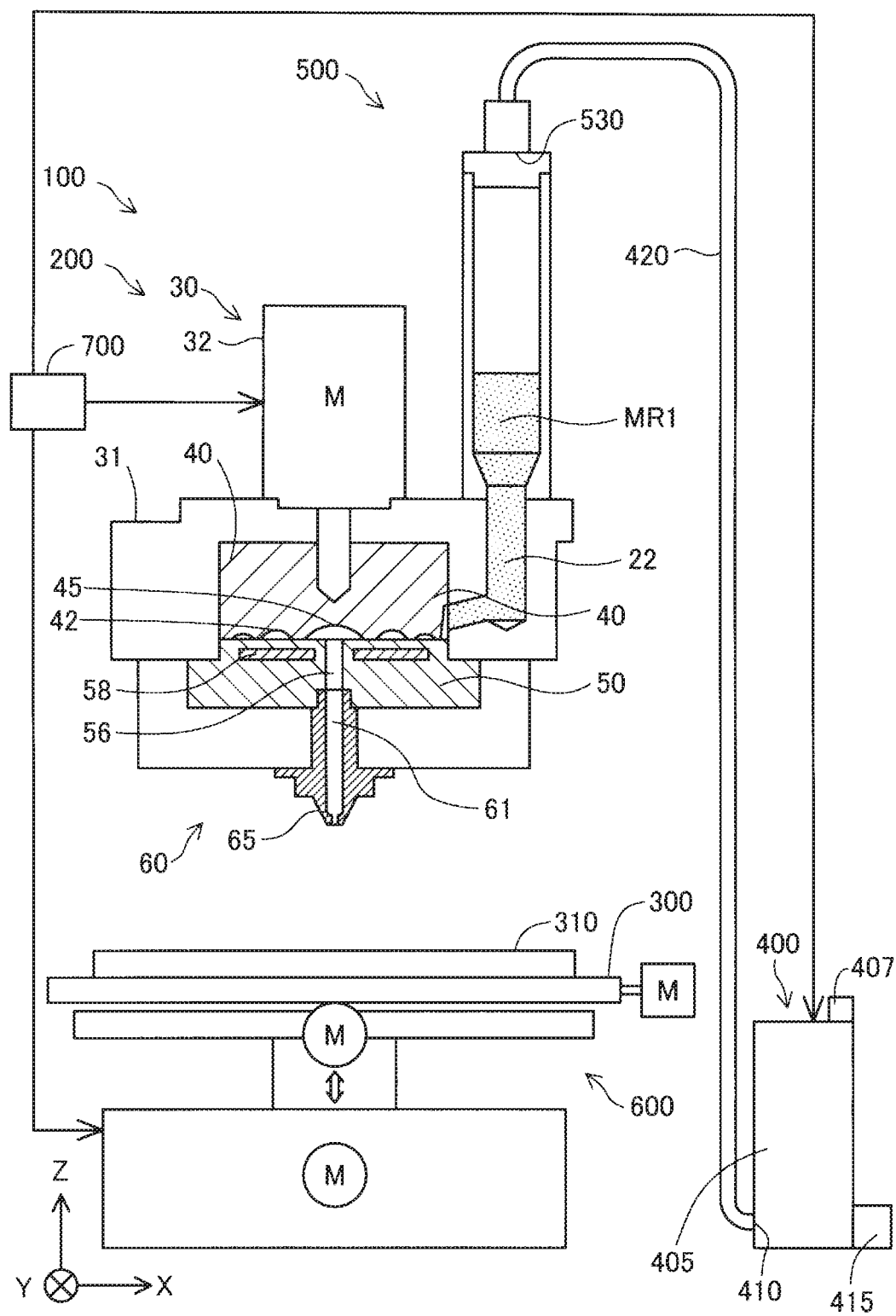
FIG. 1 is a diagram showing a schematic configuration of a three-dimensional shaping device according to a first embodiment.

FIG. 1 is a diagram showing a schematic configuration of a three-dimensional shaping device 100. FIG. 1 shows arrows along X, Y, and Z directions orthogonal to each other. The X direction and the Y direction are directions along a horizontal direction and the Z direction is a direction along a vertical direction. In other figures, the arrows along the X, Y, and Z directions are appropriately shown. The X, Y, Z directions in FIG. 1 and the X, Y, Z directions in other figures represent the same direction.

The three-dimensional shaping device 100 includes a shaping unit 200, a stage 300, a material supply unit 400, a moving mechanism 600, and a control unit 700. Under control of the control unit 700, the three-dimensional shaping device 100 supplies a material MR1 from the material supply unit 400 to the shaping unit 200, and drives the moving mechanism 600 to change a relative position between a nozzle 65 and a shaping surface 310 while discharging a shaping material generated by plasticizing the material MR1 from the nozzle 65 toward the shaping surface 310 of the stage 300, so as to shape a three-dimensional shaped object in which shaping materials are stacked on the shaping surface 310. A detailed configuration of the shaping unit 200 will be described later.

The material supply unit 400 includes a tank 405 and a material pumping mechanism 415. The material supply unit 400 supplies, via a material supply pipe 420 by the material pumping mechanism 415, the material MR1 stored in the tank 405 to a material storage unit 500 of the shaping unit 200 to be described later. The material MR1 used in the present embodiment is an ABS resin formed in a form of pellet. The material MR1 may be another material formed in the form of pellet. Details of the material MR1 will be described later.

The tank 405 is a box-shaped container having a replenishing port 407 and a supply-side coupling portion 410. The material MR1 is stored in the tank 405. The replenishing port 407 is provided at an upper portion of the tank 405, and the material MR1 is replenished from the outside to the tank 405 through the replenishing port 407. The material supply pipe 420 is coupled to the supply-side coupling portion 410. The tank 405 may be provided with, for example, a lid that opens and closes the replenishing port 407. In addition, a dryer for drying the material MR1 in the tank 405 may be provided in the tank 405.

The material supply pipe 420 is a pipe coupling the material supply unit 400 and the material storage unit 500. In the present embodiment, the material supply pipe 420 is a flexible tube, and is coupled to the supply-side coupling portion 410 and a receiving-side coupling portion 530 provided in the material storage unit 500. The receiving-side coupling portion 530 is positioned above the supply-side coupling portion 410 in a vertical direction. The material MR1 can move in the material supply pipe 420.

In the present embodiment, the material pumping mechanism 415 is a compressor. Compressed air is sent into the tank 405 by the material pumping mechanism 415, and the material MR1 together with the compressed air is pumped to the material storage unit 500 via the material supply pipe 420. The material pumping mechanism 415 is controlled by the control unit 700. The control unit 700 starts or stops an operation of the material pumping mechanism 415 and adjusts an output thereof.

The moving mechanism 600 changes the relative position between the nozzle 65 and the shaping surface 310 as described above. In the present embodiment, the moving mechanism 600 supports the stage 300, and changes the relative position between the nozzle 65 and the shaping surface 310 by moving the stage 300 with respect to the shaping unit 200. The moving mechanism 600 according to the present embodiment is implemented by a three-axis positioner that moves the stage 300 in three axial directions of the X, Y, and Z directions by drive forces of three motors. Each motor is driven under the control of the control unit 700. The moving mechanism 600 may be configured to change the relative position between the nozzle 65 and the shaping surface 310 by moving the shaping unit 200 without moving the stage 300. In addition, the moving mechanism 600 may be configured to change the relative position between the nozzle 65 and the shaping surface 310 by moving both the stage 300 and the shaping unit 200.

The control unit 700 is implemented by a computer, and includes one or more processors, a memory, and an input and output interface for inputting and outputting signals from and to the outside. The processor executes a predetermined program stored in the memory to implement a shaping processing for shaping a three-dimensional shaped object. In the shaping processing, the control unit 700 appropriately controls the shaping unit 200, the material supply unit 400, and the moving mechanism 600. Some or all of the functions of the control unit 700 may be implemented by a circuit.

In the present embodiment, the control unit 700 executes a shaping program for creating the three-dimensional shaped object, and shapes the three-dimensional shaped object based on shaping data. The shaping data is, for example, tool path data created by converting data in STL format or AMF format representing a shape of the three-dimensional shaped object with a slicer.

The shaping unit 200 includes the material storage unit 500 that stores the material MR1 supplied from the material supply unit 400 and supplies the material MR1 to a melting unit 30, the melting unit 30 that melts the material MR1 into a shaping material, and a discharge unit 60 having the nozzle 65 that discharges the shaping material supplied from the melting unit 30 toward the shaping surface 310.

Figure 2:
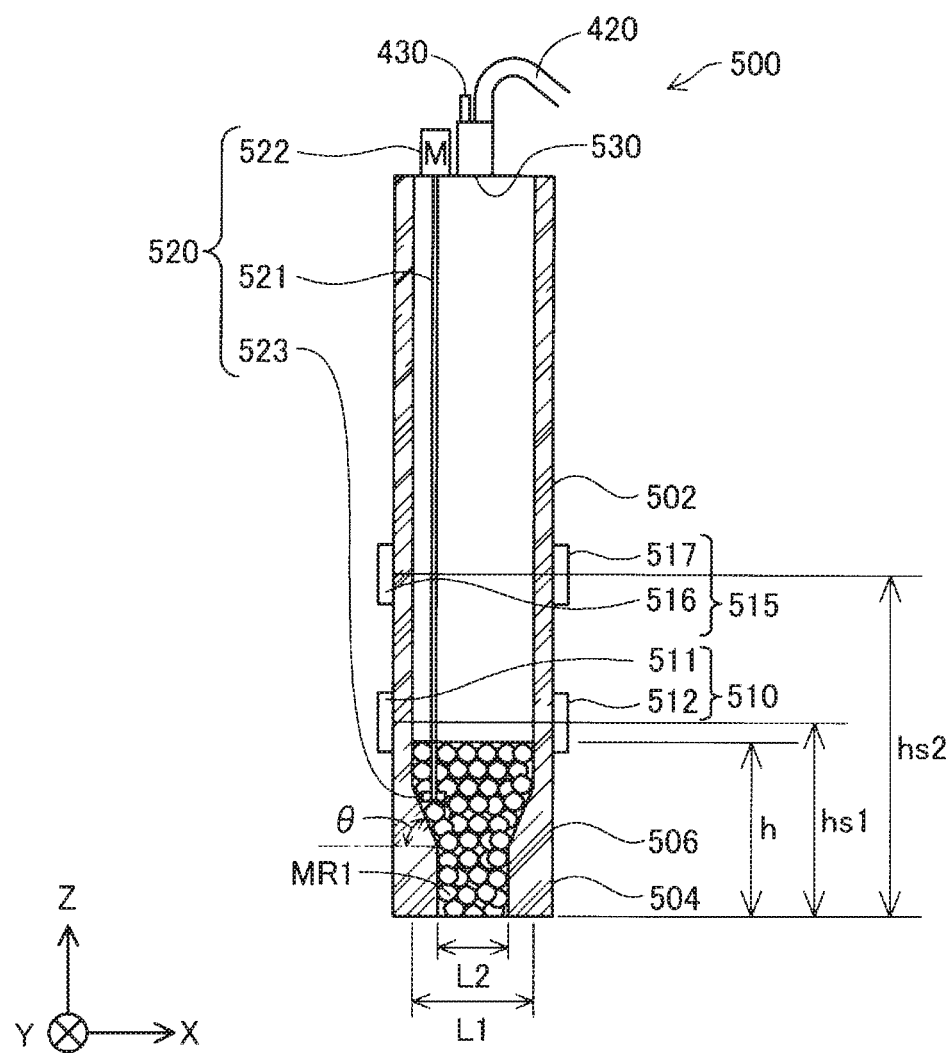
FIG. 2 is a diagram showing a configuration of a material storage unit according to the first embodiment.

FIG. 2 is a diagram showing a configuration of the material storage unit 500. The material storage unit 500 includes a cylindrical body portion 502, a mouth portion 504, and an inclined portion 506. The body portion 502, the mouth portion 504, and the inclined portion 506 are made of transparent glass. That is, the entire material storage unit 500 is transparent, and an inside of the material storage unit 500 can be viewed from the outside. The material storage unit 500 may be made of a transparent resin. The material storage unit 500 is provided with a first sensor 510, a second sensor 515, a stirring mechanism 520, and the receiving-side coupling portion 530. The material storage unit 500 may also be referred to as a "hopper".

The body portion 502 in the present embodiment has a substantially cylindrical shape. The mouth portion 504 is provided below the body portion 502 in the material storage unit 500, and has a hole for supplying the material MR1 to the melting unit 30. The mouth portion 504 has a substantially cylindrical shape and has the above hole at a position corresponding to a lower portion of the material storage unit 500. As shown in FIGS. 1 and 2, the mouth portion 504 of the material storage unit 500 and the melting unit 30 are coupled via a communication path 22. In the present embodiment, central axes of the body portion 502 and the mouth portion 504 coincide with each other and are parallel to the Z direction. The central axes of the body portion 502 and the mouth portion 504 may not coincide with each other.

A diameter L2 of the hole of the mouth portion 504 is smaller than a maximum inner diameter L1 of the body portion 502. In the present embodiment, the body portion 502 has a substantially cylindrical shape having substantially the same inner diameter L1 in an axial direction. The mouth portion 504 has a substantially cylindrical shape having substantially the same inner diameter L2 in the axial direction. The body portion 502 and the mouth portion 504 may have portions having different inner diameters in the axial direction. A cross section perpendicular to the axial direction in the body portion 502 or the mouth portion 504 may not be substantially circular. For example, when the mouth portion 504 has a substantially rectangular hole, a caliber refers to a length of a diagonal of the substantially rectangle.

The inclined portion 506 is provided between the body portion 502 and the mouth portion 504, and an inner diameter of the inclined portion 506 decreases from the body portion 502 toward the mouth portion 504. That is, an opening area of a lower end of the inclined portion 506 is smaller than an opening area of an upper end of the inclined portion 506. In the present embodiment, the upper end of the inclined portion 506 is continuous with a lower end of the body portion 502 having the inner diameter L1, and the lower end of the inclined portion 506 is continuous with an upper end of the mouth portion 504 having the inner diameter L2.

In the present embodiment, an inclination angle $\theta$ between a horizontal surface and a side surface of the inclined portion 506 is 60°. In order to effectively prevent a bridge being generated, the inclination angle $\theta$ is preferably 45° or more and less than 90°.

The receiving-side coupling portion 530 is provided on an upper portion of the body portion 502. As described above, the material supply pipe 420 is coupled to the receiving-side coupling portion 530. In the present embodiment, the receiving-side coupling portion 530 is provided with an exhaust port 430. When the material MR1 is pumped from the material supply unit 400 to the material storage unit 500 via the material supply pipe 420 by the material pumping mechanism 415, the material MR1 is supplied to the body portion 502, and air carrying the material MR1 is exhausted from the exhaust port 430.

The first sensor 510 and the second sensor 515 function as remaining state detection units for detecting a remaining state of the material MR1 stored in the material storage unit 500. The first sensor 510 and the second sensor 515 are optical sensors configured to optically detect the remaining state of the material MR1 from the outside of the material storage unit 500 via a transparent portion of the material storage unit 500, and are provided on an outer side surface of the body portion 502 in the present embodiment.

The first sensor 510 is a photoelectric sensor including a first light emitting portion 511 and a first light receiving portion 512 disposed at positions sandwiching side surfaces of the body portion 502 from the outside. The first light emitting portion 511 includes a light emitting diode as a light source, and a light beam emitted from the first light emitting portion 511 toward the body portion 502 is received by the first light receiving portion 512. The first light receiving portion 512 includes a photodiode as a light receiving element, and outputs a current having a different magnitude according to an intensity of the received light beam. A user can move a position at which the first sensor 510 is installed to any desired position sandwiching the material storage unit 500 from the outside. The second sensor 515 is also a photoelectric sensor including a second light emitting portion 516 and a second light receiving portion 517 disposed at positions sandwiching the side surfaces of the body portion 502 from the outside, and has similar configuration as the first sensor 510.

In the present embodiment, the first sensor 510 detects whether the material MR1 is present at a position of a first reference value hs1 as the remaining state. The first reference value hs1 is a value related to a remaining amount of the material MR1. In the present embodiment, a height of the material MR1 is used as the remaining amount of the material MR1. That is, the first reference value is a value of the height of the material MR1. The height of the material MR1 indicates a height h of the material MR1 stored in the material storage unit 500 from a lower end of the mouth portion 504. Specifically, a light beam emitted from the first light emitting portion 511 provided at a height of the first reference value hs1 toward the body portion 502 is received by the first light receiving portion 512. Since the intensity of the light beam received by the first light receiving portion 512 changes depending on whether the material MR1 is present on a trajectory of the light beam, it is possible to detect whether the material MR1 is present at the height of the first reference value hs1. The second sensor 515 detects whether the material MR1 is present at a position of a second reference value hs2. As will be described later, since the second reference value hs2 is larger than the first reference value hs1, the second sensor 515 is provided at a position higher than the first sensor 510.

In the present embodiment, the control unit 700 functions as a remaining amount determination unit that determines whether the remaining amount of the material MR1 stored in the material storage unit 500 is less than the first reference value hs1 based on the remaining state. That is, when the first sensor 510 detects that the material MR1 is present at the height of the first reference value hs1, the control unit 700 determines that the height h as the remaining amount is equal to or larger than the first reference value hs1. When the first sensor 510 detects that the material MR1 is not present at the height of the first reference value hs1, the control unit 700 determines that the height h is less than the first reference value hs1. The control unit 700 can also determine whether the height h is less than the second reference value hs2 based on the remaining state detected by the second sensor 515.

The first reference value hs1 is determined as a value at which the height of the material MR1 when the remaining amount is equal to the first reference value hs1 is less than a height of the body portion 502. The first reference value hs1 can be determined by an experiment, for example, as a value of the height at which an amount of the material MR1 supplied to the melting unit 30 during the shaping is not insufficient. The second reference value hs2 is a value larger than the first reference value hs1, and is determined as a value at which the height of the material MR1 when the remaining amount is equal to the second reference value hs2 is less than the height of the body portion 502. In the present embodiment, the second reference value hs2 is a value determined by an experiment as the value of the height of the material MR1 that does not generate the bridge in the material storage unit 500. In the present embodiment, the first reference value hs1 and the second reference value hs2 are larger than a height of the lower end of the body portion 502.

The stirring mechanism 520 includes a stirring shaft 521 and a stirring mechanism drive unit 522. The stirring mechanism drive unit 522 is provided on the upper portion of the body portion 502 and includes a motor that rotates about a rotation axis parallel to the Z direction. The stirring shaft 521 is a shaft coupled to the stirring mechanism drive unit 522 and extending in a −Z direction from the upper portion of the body portion 502 into the material storage unit 500, and includes a blade 523 at a lower end thereof. The stirring mechanism 520 functions as an impact generation unit that applies an impact to the material MR1 in the material storage unit 500. That is, the stirring mechanism drive unit 522 is controlled by the control unit 700 and rotates the stirring shaft 521 and the blade 523, so as to stir the material MR1 in the material storage unit 500. In the present embodiment, the stirring mechanism 520 is disposed at a position that does not affect the detection of the remaining state by the first sensor 510 and the second sensor 515.

As shown in FIG. 1, the discharge unit 60 includes the nozzle 65, and a supply flow path 61 that communicates with the melting unit 30 and supplies the shaping material to the nozzle 65.

The melting unit 30 plasticizes the material MR1 supplied from the material storage unit 500 to generate the shaping material in the form of paste in which fluidity is exhibited, and guides the shaping material to the discharge unit 60. The melting unit 30 includes a screw case 31, a drive motor 32, a flat screw 40, and a screw facing portion 50. The flat screw 40 is also referred to as a "scroll". The screw facing portion 50 is also referred to as a "barrel". The melting unit 30 does not have to melt all kinds of substances constituting the shaping material. The melting unit 30 may convert the shaping material into a state having fluidity as a whole by melting at least some kinds of the substances among the substances constituting the shaping material.

The flat screw 40 has a substantially columnar shape whose height along a central axis RX thereof is smaller than a diameter thereof. In the present embodiment, the flat screw 40 is disposed such that the central axis RX thereof is parallel to the Z direction.

The flat screw 40 is accommodated in the screw case 31. An upper surface side of the flat screw 40 is coupled to the drive motor 32, and the flat screw 40 rotates about the central axis RX within the screw case 31 by a rotation drive force generated by the drive motor 32. The drive motor 32 is controlled and driven by the control unit 700.

A groove portion 42 is formed on a lower surface of the flat screw 40. The communication path 22 above communicates with the groove portion 42 from a side surface of the flat screw 40.

The lower surface of the flat screw 40 faces an upper surface of the screw facing portion 50. A space is formed between the groove portion 42 on the lower surface of the flat screw 40 and the upper surface of the screw facing portion 50. The material MR1 is supplied from the material storage unit 500 to this space. Specific configurations of the flat screw 40 and the groove portion 42 will be described later.

A heater 58 for heating the material MR1 is embedded in the screw facing portion 50. The material MR1 supplied into the groove portion 42 of the flat screw 40 flows along the groove portion 42 by rotation of the flat screw 40 while being melted in the groove portion 42, and, as the shaping material, is guided to a central portion 45 of the flat screw 40. The shaping material in the form of paste flowing into the central portion 45 is supplied to the discharge unit 60 via a communication hole 56 provided at a center of the screw facing portion 50.

Figure 3:
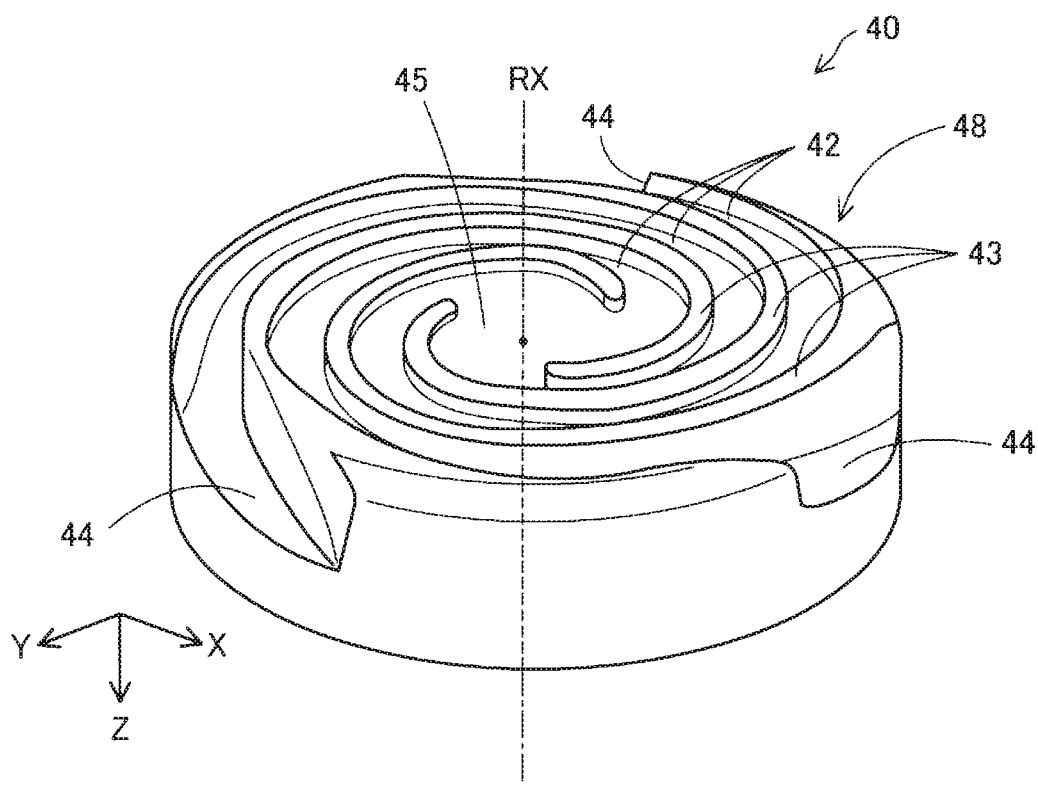
FIG. 3 is a schematic perspective view showing a configuration of a lower surface side of a flat screw.

FIG. 3 is a schematic perspective view showing a configuration of a lower surface side of the flat screw 40. In FIG. 3, a position of the central axis RX of the flat screw 40 is shown by a dashed line. The groove portion 42 is provided on the lower surface of the flat screw 40 facing the screw facing portion 50. Hereinafter, the lower surface of the flat screw 40 is referred to as a "groove forming surface 48".

The central portion 45 of the groove forming surface 48 of the flat screw 40 is implemented as a recess to which one end of the groove portion 42 is coupled. The central portion 45 faces the communication hole 56 of the screw facing portion 50. In the first embodiment, the central portion 45 intersects the central axis RX.

The groove portion 42 of the flat screw 40 forms a so-called scroll groove. The groove portion 42 extends from the central portion 45 toward an outer periphery of the flat screw 40 in a form of swirl so as to draw an arc. The groove portion 42 may extend spirally. The groove forming surface 48 is provided with ridge portions 43 that form side wall portions of respective groove portions 42 and extend along the respective groove portions 42.

The groove portion 42 extends to a material inflow port 44 formed in the side surface of the flat screw 40. The material inflow port 44 is a portion that receives the material MR1 supplied from the material supply unit 400 via the communication path 22.

FIG. 3 shows an example of the flat screw 40 including three groove portions 42 and three ridge portions 43. The number of the groove portions 42 or the ridge portions 43 provided on the flat screw 40 is not limited to three. The flat screw 40 may be provided with only one groove portion 42, or may be provided with two or more groove portions 42. Any number of the ridge portions 43 may be provided in accordance with the number of the groove portions 42.

FIG. 3 shows an example of the flat screw 40 in which the material inflow port 44 is formed at three places. The number of the material inflow ports 44 provided in the flat screw 40 is not limited to three. The flat screw 40 may be provided with the material inflow port 44 only at one place, or at two or more places.

Figure 4:
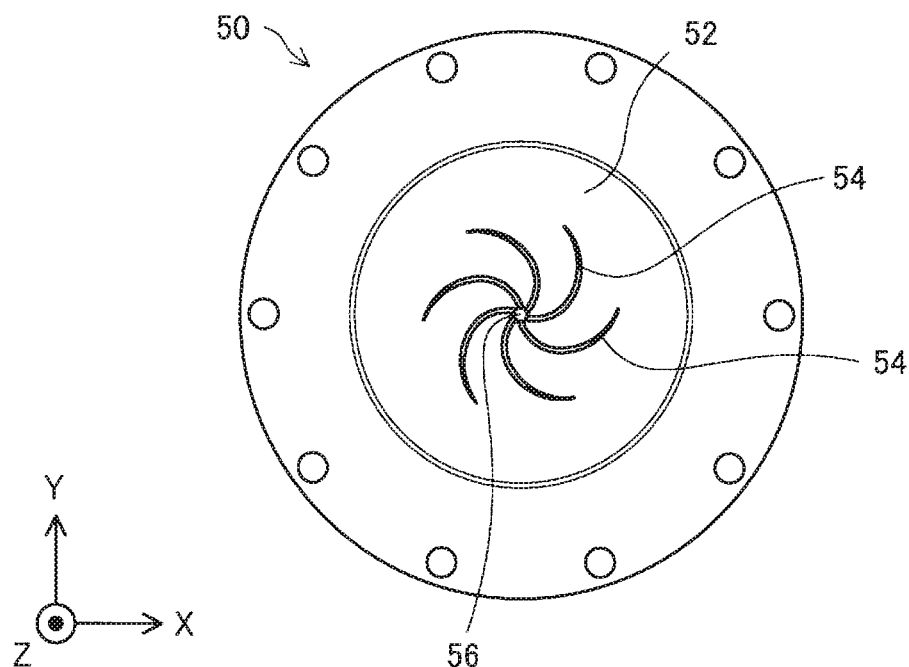
FIG. 4 is a schematic plan view showing a configuration of an upper surface side of a screw facing portion.

FIG. 4 is a schematic plan view showing a configuration of an upper surface side of the screw facing portion 50. The upper surface of the screw facing portion 50 faces the groove forming surface 48 of the flat screw 40 as described above. Hereinafter, the upper surface of the screw facing portion 50 is referred to as a "screw facing surface 52". The communication hole 56 for supplying the shaping material to the discharge unit 60 is formed at a center of the screw facing surface 52.

A plurality of guide grooves 54, coupled to the communication hole 56 and extending in the form of swirl from the communication hole 56 towards an outer periphery, are formed on the screw facing surface 52. The plurality of guide grooves 54 have a function of guiding, to the communication hole 56, the shaping material flowing into the central portion 45 of the flat screw 40.

When the flat screw 40 rotates, the material MR1 supplied from the material inflow port 44 is guided to the groove portion 42 to move toward the central portion 45 while being heated in the groove portion 42. As the central portion 45 is closer to the material MR1, the material MR1 is more melted and has increased fluidity, and is converted into the shaping material. The shaping material concentrated in the central portion 45 flows out from the communication hole 56 to the discharge unit 60 due to an internal pressure generated in the central portion 45.

Figure 5:
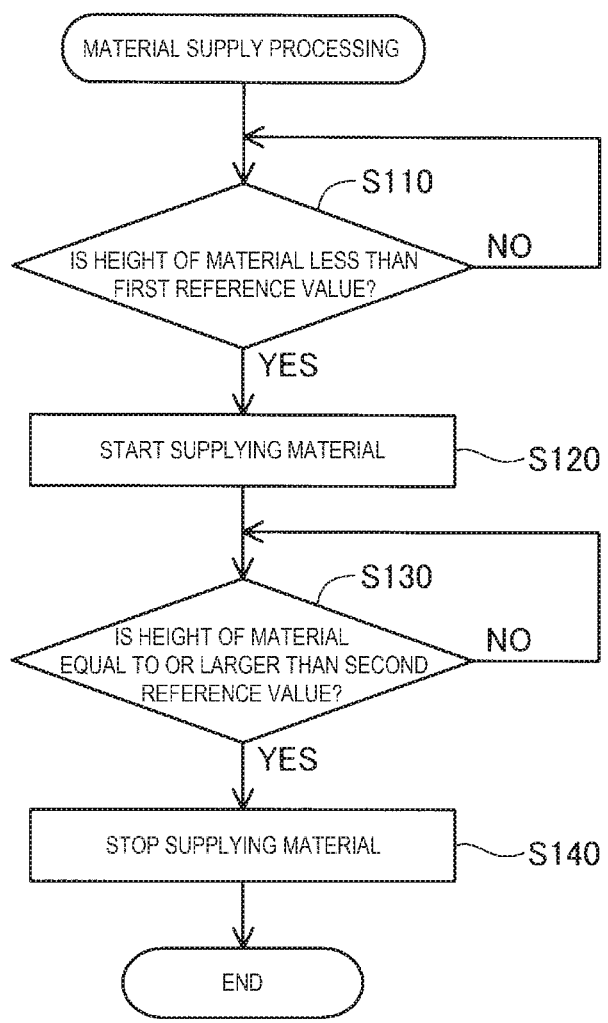
FIG. 5 is a process diagram of a material supply processing according to the first embodiment.

FIG. 5 is a process diagram of a material supply processing according to the first embodiment. The material supply processing is repeatedly executed while the above shaping of the three-dimensional shaped object is performed.

In step S110, the control unit 700 determines whether the height h as the remaining amount of the material MR1 is less than the first reference value hs1 based on the remaining state detected by the first sensor 510. When it is determined that the height h of the material MR1 is not less than the first reference value hs1, the processing returns to step S110 again. That is, the processing in step S110 is repeated until the height h of the material MR1 is less than the first reference value hs1.

When it is determined in step S110 that the height h of the material MR1 is less than the first reference value hs1, in step S120, the control unit 700 controls the material pumping mechanism 415 to start supplying the material MR1 from the material supply unit 400 to the material storage unit 500 via the material supply pipe 420. In FIG. 2, since the height h of the material MR1 is less than the first reference value hs1, the supply of the material MR1 is started in this case.

In step S130, the control unit 700 determines whether the height h of the material MR1 is equal to or larger than the second reference value hs2 based on the remaining state detected by the second sensor 515. Here, when it is determined that the height h of the material MR1 is less than the second reference value hs2, the control unit 700 continues the supply of the material MR1 from the material supply unit 400 to the material storage unit 500.

When it is determined in step S130 that the height h of the material MR1 is equal to or larger than the second reference value hs2, in step S140, the control unit 700 controls the material pumping mechanism 415 to stop supplying the material MR1 from the material supply unit 400 to the material storage unit 500.

After step S140, the material supply processing ends. When the three-dimensional shaped object is continued to be shaped after the material supply processing is ended, the material supply processing is executed again.

The control unit 700 may always drive the stirring mechanism 520 during the shaping of the three-dimensional shaped object, or may drive the stirring mechanism 520 only when the material MR1 is supplied to the material storage unit 500, for example.

According to the three-dimensional shaping device 100 of the present embodiment described above, it is determined whether the height h as the remaining amount of the material MR1 is less than the first reference value hs1 based on the remaining state of the material MR1 in the form of pellet, and when the height h of the material MR1 is less than the first reference value hs1, the material MR1 is supplied from the material supply unit 400 to the material storage unit 500 until the height h of the material MR1 is equal to or larger than the first reference value hs1. Therefore, the amount of the material MR1 remaining in the material storage unit 500 during the shaping is reduced, and the generation of the bridge in the material storage unit 500 can be prevented.

In the present embodiment, the remaining state of the material MR1 is optically detected from the outside of the material storage unit 500 by the first sensor 510 and the second sensor 515 provided on the outer side surface of the transparent body portion 502. Therefore, the remaining state can be detected without disturbing the flow of the material MR1 from the inside of the material storage unit 500 to the melting unit 30. Accordingly, the generation of the bridge in the material storage unit 500 can be prevented.

In the present embodiment, the material MR1 is supplied to the material storage unit 500 until the height h of the material MR1 is equal to or larger than the second reference value hs2, which is larger than the first reference value hs1, and the second reference value hs2 is determined as a value less than the height of the body portion 502. Therefore, it is possible to maintain a state where the material storage unit 500 is not filled with the material MR1 during the shaping. In addition, in the present embodiment, since the second reference value hs2 is a value of the height of the material MR1 that does not generate the bridge in the material storage unit 500, the generation of the bridge in the material storage unit 500 can be prevented.

In the present embodiment, the material storage unit 500 includes the inclined portion 506 whose inner diameter decreases from the body portion 502 toward the mouth portion 504. Therefore, stagnation of the material MR1 in a vicinity of the upper end of the mouth portion 504 can be prevented.

In the present embodiment, the stirring mechanism 520 for stirring the material MR1 stored in the material storage unit 500 is provided. Therefore, it is possible to prevent interference between materials MR1 in the material storage unit 500 by stirring the material MR1 in the material storage unit 500 by using the stirring mechanism 520.

In the present embodiment, the material MR1 is pumped by the material pumping mechanism 415 to the receiving-side coupling portion 530 positioned above the supply-side coupling portion 410 from the supply-side coupling portion 410 via the material supply pipe 420. Therefore, when the control unit 700 stops the material pumping mechanism 415, the material MR1 in the material supply pipe 420 is more likely to move to the material supply unit 400 than to the material storage unit 500, and excessive supply of the material MR1 to the material storage unit 500 can be prevented. In addition, since the material supply unit 400 can be provided at a position lower than the material storage unit 500, the material supply unit 400 can be provided at a position where the material MR1 can be easily replenished to the material supply unit 400 by a hand of the user, for example.

Here, the material of the three-dimensional shaped object used in the three-dimensional shaping device 100 described above will be described. The three-dimensional shaping device 100 can use various materials such as a material having thermoplasticity, a metal material, and a ceramic material as a main material to shape the three-dimensional shaped object. Here, the "main material" means a central material for forming a shape of the three-dimensional shaped object, and a material occupying a content of 50% by weight or more in the three-dimensional shaped object. The above shaping materials include those in which the main materials are melted alone, and those in which some of the components contained together with the main materials are melted to form a paste.

When the material having thermoplasticity is used as the main material, the shaping material is generated by plasticizing the material in the melting unit 30. The term "plasticize" means that the material having thermoplasticity is heated and melted.

For example, a material obtained by molding the following thermoplastic resin material into the form of pellet can be used as the material having thermoplasticity.

Example of Thermoplastic Resin Material

General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyetheretherketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyetherimide, and polyetheretherketone An additive such as a wax, a flame retardant, an antioxidant, and a heat stabilizer in addition to a pigment, a metal, and a ceramic may be mixed to the material having thermoplasticity. In this case, a molded material in the form of pellet obtained by mixing the thermoplastic resin material and the additive and the like can be used as the material having thermoplasticity. The material having thermoplasticity is plasticized by the rotation of the flat screw 40 and the heating of the heater 58 and is then converted into a melted state in the melting unit 30. After the shaping material generated by melting the material having thermoplasticity is discharged from the nozzle 65, the shaping material is cured due to a reduction in temperature.

It is desirable that the material having thermoplasticity is injected from the nozzle 65 in a state where the material is heated to a temperature equal to or higher than a glass transition point thereof and is then in a completely melted state. For example, a glass transition point of the ABS resin is about 120° C., and it is desirable that the ABS resin is discharged from the nozzle 65 at about 200° C. In order to discharge the shaping material in such a high temperature state, a heater may be provided in a periphery of the nozzle 65.

The following metal materials, for example, may be used as the main material in the three-dimensional shaping device 100 instead of the above material having thermoplasticity. In this case, it is desirable that a component to be melted at the time of generating the shaping material is mixed with a powder material obtained by converting the following metal material into powder, and then the material molded into the form of pellet is charged into the melting unit 30.

Example of Metal Material

A single metal of magnesium (Mg), iron (Fe), cobalt (Co) or chromium (Cr), aluminum (Al), titanium (Ti), copper (Cu), and nickel (Ni), or an alloy containing one or more of these metals

Example of Alloy

Maraging steel, stainless steel, cobalt chrome molybdenum, titanium alloy, nickel alloy, aluminum alloy, cobalt alloy, and cobalt chromium alloy A ceramic material may be used as the main material in the three-dimensional shaping device 100 instead of the above metal material. As the ceramic material, for example, oxide ceramics such as silicon dioxide, titanium dioxide, aluminum oxide, and zirconium oxide, and non-oxide ceramics such as aluminum nitride can be used. When the metal material or the ceramic material as described above is used as the main material, the shaping material discharged onto the shaping surface 310 may be cured by sintering.

The metal material or the ceramic material charged into the material storage unit 500 as the material MR1 may be a mixed material obtained by mixing a plurality of types of powder including single metal powder, alloy powder, and ceramic material powder and molding the powder into the form of pellet. The powder material of the metal material or the ceramic material may be coated with, for example, the thermoplastic resin shown above or another thermoplastic resin. In this case, the thermoplastic resin may be melted in the melting unit 30 to exhibit fluidity.

For example, a material obtained by adding following solvents to the metal material or the ceramic material to form a pellet can also be used as the material MR1. A solvent can be used alone or in combination of two or more types selected from the following.

Example of Solvent

Water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, tetraalkylammonium acetates (such as tetrabutylammonium acetate), and ionic liquids such as butyl carbitol acetate In addition, for example, a material obtained by adding the following binders to the metal material or the ceramic material to form a pellet can also be used as the material MR1.

Example of Binder

Acrylic resin, epoxy resin, silicone resin, cellulose-based resin or other synthetic resins or polylactic acid (PLA), polyamide (PA), polyphenylene sulfide (PPS), polyetheretherketone (PEEK) or other thermoplastic resins

B. Second Embodiment

Figure 6:
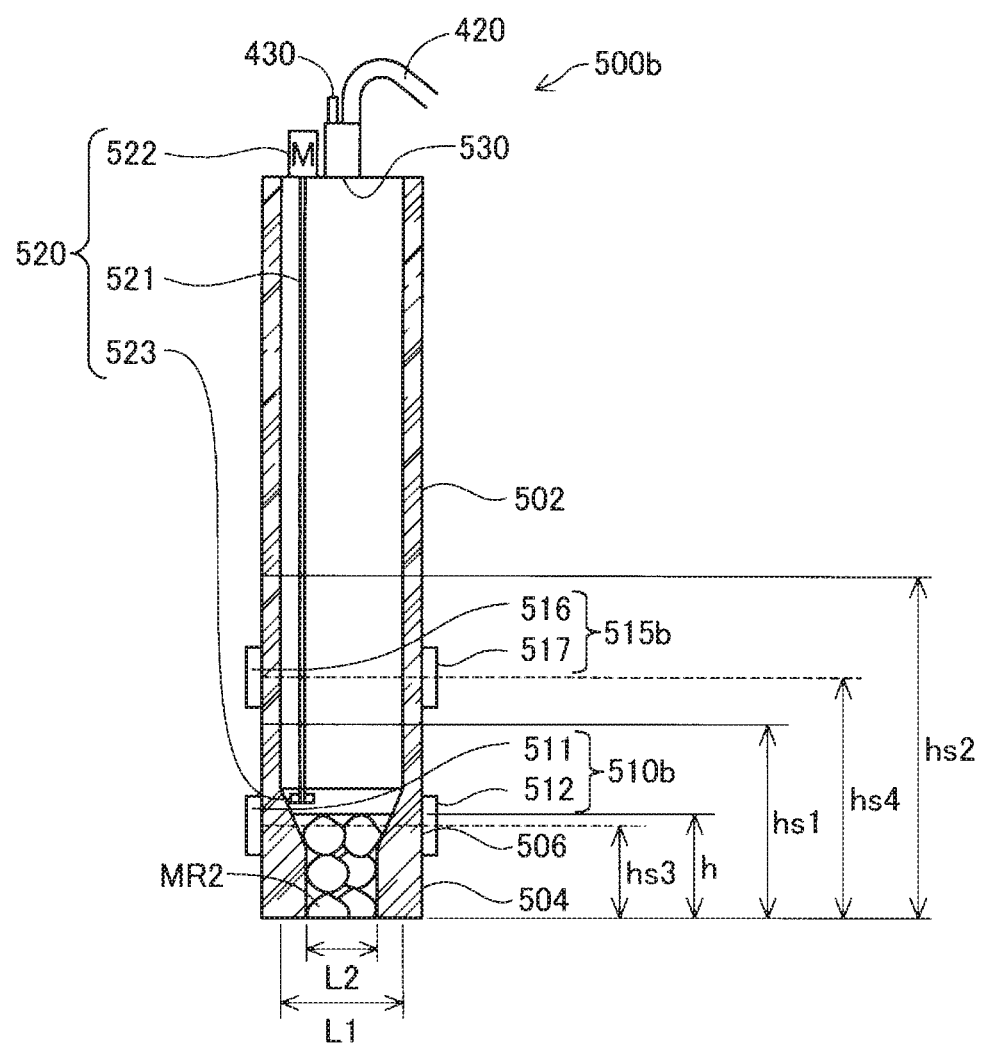
FIG. 6 is a diagram showing a configuration of a material storage unit according to a second embodiment.

FIG. 6 is a diagram showing a configuration of a material storage unit 500b in a three-dimensional shaping device 100b according to a second embodiment. Since a configuration of the three-dimensional shaping device 100b other than the material storage unit 500b in the second embodiment is similar to that of the first embodiment, a description thereof is omitted. Apart of the material storage unit 500b not particularly described has a configuration similar to that of the material storage unit 500 of the first embodiment.

In the three-dimensional shaping device 100b, a material MR2 is used instead of the material MR1. The material MR2 is an ABS resin molded into the form of pellet, and has a maximum outer dimension larger than that of the material MR1. The maximum outer dimension refers to a length of a straight line coupling two farthest points on an outer surface constituting the material. The material MR2 supplied from the material supply unit 400 is stored in the material storage unit 500b. The material MR1 may be referred to as a first material, and the material MR2 may be referred to as a second material.

Since the material MR2 has the maximum outer dimension larger than that of the material MR1, in the case of using the material MR2, the materials are more likely to interfere with each other in the material storage unit 500b than in the case of using the material MR1. Therefore, in the case of using the material MR2, the bridge is more likely to be generated in the material storage unit 500b than in the case of using the material MR1.

In the present embodiment, hs3, which is a value of a height smaller than hs1, is used as the first reference value, and hs4, which is a value of a height smaller than hs2, is used as the second reference value. A magnitude of the value descends in the order of hs3, hs1, hs4, and hs2. The first reference value hs3 is determined as a product of, for example, hs1, a magnification of the maximum outer dimension of the material MR2 with respect to a maximum outer dimension of the material MR1, and an appropriate coefficient having a value of 1 or more. The second reference value hs4 may be similarly determined with respect to hs2.

The body portion 502 of the material storage unit 500b is provided with a first sensor 510b and a second sensor 515b. In the present embodiment, since values of the first reference value and the second reference value are different from those in the first embodiment, the first sensor 510b is provided at a position of the height hs3, and the second sensor 515b is provided at a position of the height hs4. Other configurations are similar to those of the first sensor 510 and the second sensor 515 in the first embodiment.

Also in the present embodiment, the similar processing as the material supply processing shown in FIG. 5 can be executed. Since the height h of the material MR2 in FIG. 6 is not less than the first reference value hs3 in the present embodiment, the supply of the material MR2 is not started in this case.

Even with such a configuration of the material storage unit 500b, the generation of the bridge in the material storage unit 500b can be prevented. In particular, in the case of using the material MR2 having the maximum outer dimension larger than that of the material MR1, an amount of the material MR2 remaining in the material storage unit 500b during the shaping is smaller than in the case of using the material MR1, and the generation of the bridge in the material storage unit 500b can be prevented.

C. Third Embodiment

Figure 7:
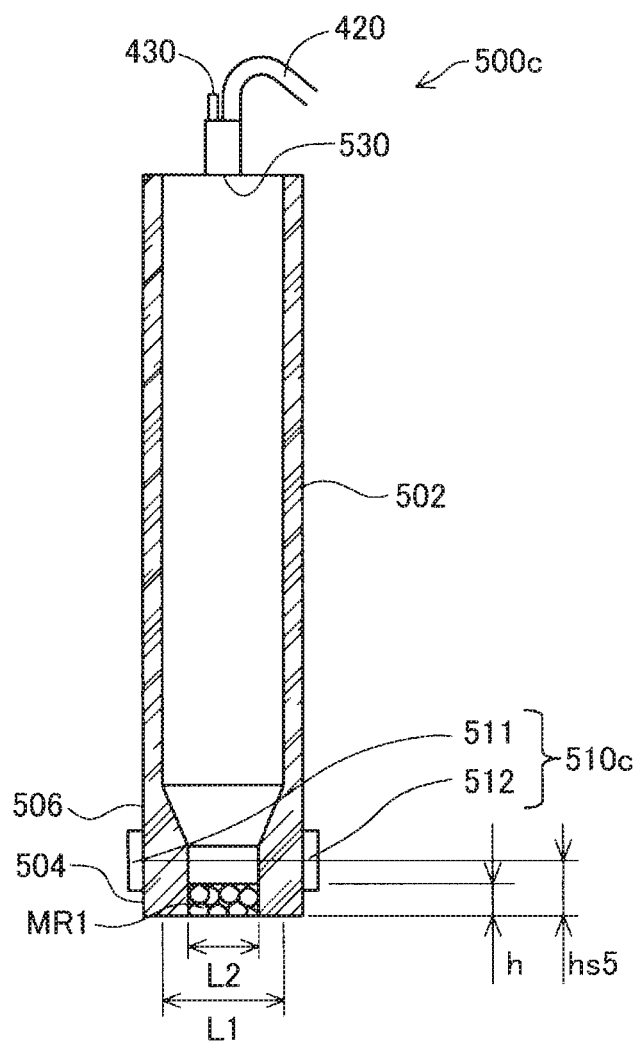
FIG. 7 is a diagram showing a configuration of a material storage unit according to a third embodiment.

FIG. 7 is a diagram showing a configuration of a material storage unit 500c in a three-dimensional shaping device 100c according to a third embodiment. Since a configuration of the three-dimensional shaping device 100c other than the material storage unit 500c in the third embodiment is similar to that of the first embodiment, a description thereof is omitted. Apart of the material storage unit 500c not particularly described has a configuration similar to that of the material storage unit 500 of the first embodiment. In the three-dimensional shaping device 100c, the material MR1 is used similar to the three-dimensional shaping device 100 of the first embodiment.

In the present embodiment, hs5 is used as the first reference value. The first reference value hs5 is determined as a value at which the height h of the material MR1 when the remaining amount is equal to the first reference value hs5 is less than the height of the body portion 502. In the present embodiment, the first reference value hs5 is determined as a value of the height. Although the second reference value is not used in the shaping processing in the present embodiment, the second reference value may be used in the shaping processing similar to the cases of the first embodiment and the second embodiment.

In the present embodiment, a first sensor 510c is provided on the outer side surface of the body portion 502, but the second sensor 515 is not provided. The first sensor 510c is provided at a position of the height hs5. Other configurations of the first sensor 510c are similar to those of the first sensor 510 in the first embodiment. When the second reference value is used in the shaping processing, the second sensor 515 may be provided. In addition, the stirring mechanism 520 is not provided in the body portion 502, but the stirring mechanism 520 may be provided.

Figure 8:
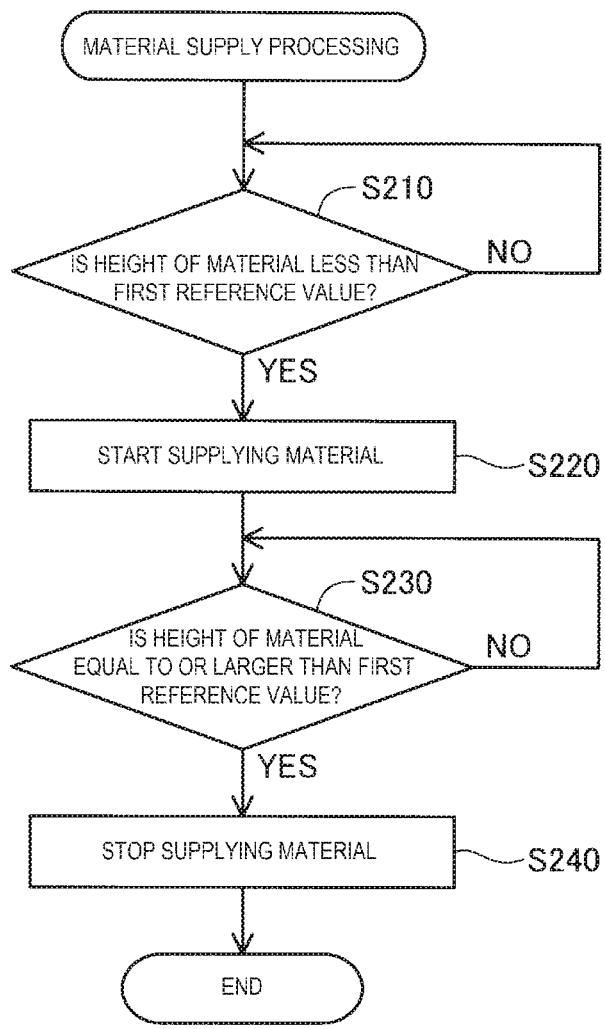
FIG. 8 is a process diagram of a material supply processing according to the third embodiment.

FIG. 8 is a process diagram of a material supply processing according to the third embodiment. Similar to the material supply processing in the first embodiment, the material supply processing is repeatedly executed while the shaping of the three-dimensional shaped object is performed. Since steps S210 and S220 are similar to steps S110 and S120 of the shaping processing in the first embodiment shown in FIG. 5, and a description thereof is omitted.

In step S230, the control unit 700 determines whether the height h of the material MR1 is equal to or larger than the first reference value hs5 based on a remaining state detected by the first sensor 510c. Here, when it is determined that the height h of the material MR1 is less than the first reference value hs5, the control unit 700 continues the supply of the material MR1 from the material supply unit 400 to the material storage unit 500c.

When it is determined in step S230 that the height h of the material MR1 is equal to or larger than the first reference value hs5, the control unit 700 controls the material pumping mechanism 415 to stop supplying the material MR1 from the material supply unit 400 to the material storage unit 500c. Since step S240 is similar to step S140, the description thereof is omitted.

Even with such a configuration of the material storage unit 500c, the generation of the bridge in the material storage unit 500c can be prevented. In particular, the generation of the bridge in the vicinity of the upper end of the mouth portion 504 can be prevented by determining the first reference value hs5 as a value less than a height of the mouth portion 504.

D. Fourth Embodiment

Figure 9:
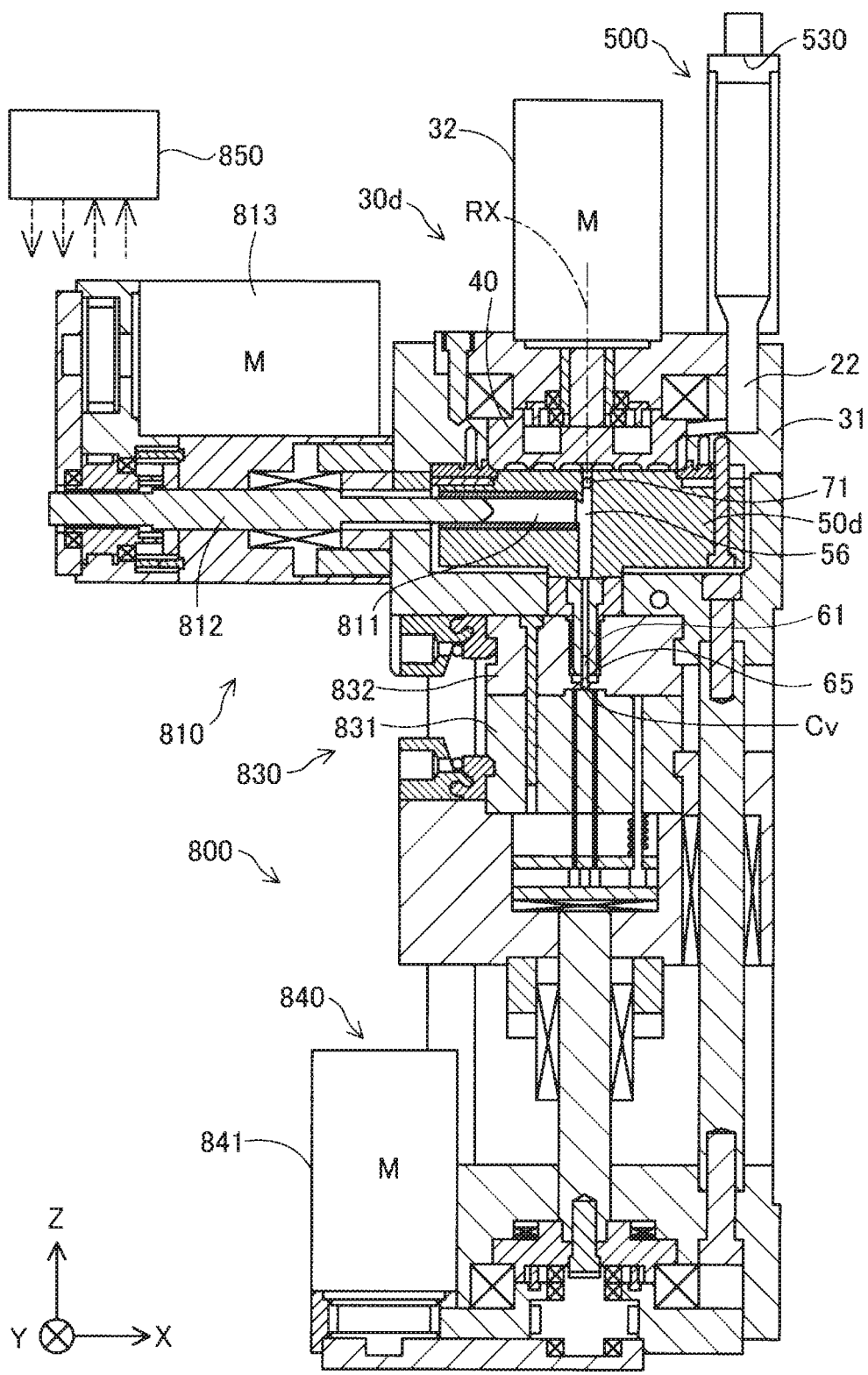
FIG. 9 is a diagram showing a schematic configuration of an injection molding device according to a fourth embodiment.

FIG. 9 is a diagram showing a schematic configuration of an injection molding device 800 according to a fourth embodiment. The injection molding device 800 of the present embodiment includes a melting unit 30d, the nozzle 65, the material storage unit 500, an injection control mechanism. 810, a mold unit 830, and a mold clamping device 840.

Configurations of the melting unit 30d and the material storage unit 500 are the same as those of the first embodiment, unless otherwise specified. Similarly to the first embodiment, the material storage unit 500 is supplied with the material MR1 from the material supply unit 400 (not shown) via the material supply pipe 420.

The melting unit 30d includes, as described in the first embodiment, the flat screw 40 and a barrel 50d. An injection cylinder 811 to be described later is coupled to the communication hole 56 of the barrel 50d of the present embodiment. Under control of a control unit 850, the melting unit 30d plasticizes at least a part of the material supplied to the groove portion 42 of the flat screw 40 to generate the molten material in the form of paste having fluidity, and guides the molten material from the communication hole 56 to the injection control mechanism 810.

The injection control mechanism 810 includes the injection cylinder 811, a plunger 812, and a plunger drive unit 813. The injection control mechanism 810 has a function of injecting the molten material in the injection cylinder 811 into a cavity Cv to be described later. The injection control mechanism 810 controls an injection amount of the molten material from the nozzle 65 under the control of the control unit 850. The injection cylinder 811 is a substantially cylindrical member coupled to the communication hole 56 of the barrel 50d, and includes the plunger 812 therein. The plunger 812 slides in the injection cylinder 811 and pumps the molten material in the injection cylinder 811 to the nozzle 65 coupled to the melting unit 30d. The plunger 812 is driven by the plunger drive unit 813 implemented by a motor.

The mold unit 830 includes a movable mold 831 and a fixed mold 832. The movable mold 831 and the fixed mold 832 are provided to face each other, and the cavity Cv that is space corresponding to a shape of a molded object is formed between the movable mold 831 and the fixed mold 832. The molten material is pumped to the cavity Cv by the injection control mechanism 810 and is injected via the nozzle 65.

The mold clamping device 840 includes a mold drive unit 841, and has a function of opening and closing the movable mold 831 and the fixed mold 832. Under the control of the control unit 850, the mold clamping device 840 drives the mold drive unit 841 to move the movable mold 831 to open and close the mold unit 830.

As described above, since the injection molding device 800 of the present embodiment described above includes the material storage unit 500 having the same configuration as that of the first embodiment, the amount of the material MR1 remaining in the material storage unit 500 during injection and molding is reduced, and the generation of the bridge in the material storage unit 500 can be prevented.

E. Other Embodiments (E-1) In the above embodiments, the height h of the material MR1 stored in the material storage unit 500 is used as the remaining amount of the material MR1 stored in the material storage unit 500. In contrast, for example, a weight of the material MR1 may be used as the remaining amount. In this case, the first reference value is a weight value. In this case, a weight sensor instead of the optical first sensor 510 may be provided as the remaining state detection unit, and the weight of the material MR1 may be detected as the remaining state by the weight sensor. The control unit 700 as the remaining amount determination unit can compare the weight of the material MR1 detected by the weight sensor with the first reference value to determine whether the remaining amount of the material MR1 is less than the first reference value. In addition, the remaining amount may be a volume of the material MR1 stored in the material storage unit 500, and the first reference value may be a volume value. In this case, for example, the volume of the material MR1 stored in the material storage unit 500 can be detected based on the weight of the material MR1 and the volume per material MR1. The volume of the material MR1 stored in the material storage unit 500 may be detected based on the height h of the material MR1 and an opening area of the material storage unit 500. Similarly to the first reference value and the first sensor 510, the second reference value and the second sensor 515 may be formed as described above.

(E-2) In the above embodiments, the entire material storage unit 500 is made of transparent glass. In contrast, for example, only the body portion 502, which is a part of the material storage unit 500, may be made of transparent glass. In this case, a portion where the remaining state of the material MR1 in the material storage unit 500 can be detected by an optical sensor provided outside the material storage unit 500 is preferably transparent. For example, when the height h of the material MR1 is detected as the remaining state by irradiating the material MR1 in the material storage unit 500 with a laser from an optical sensor provided in an upper portion of the material storage unit 500, the entire material storage unit 500 may be opaque. Even when the remaining state detection unit does not optically detect a remaining amount state, for example, in the case of a weight sensor, the entire material storage unit 500 may be opaque.

(E-3) In the above embodiments, the control unit 700 functions as the remaining amount determination unit. In contrast, the remaining amount determination unit may be provided separately from the control unit 700. For example, the first sensor 510 may include a remaining amount determination unit.

(E-4) In the above embodiments, for example, it may be configured that the amount of the material MR1 required for shaping one layer is calculated based on the shaping data, and when the height h of the material MR1 stored in the material storage unit 500 is less than the height hs1, the calculated amount of material MR1 is supplied to the material storage unit 500. In addition, the amount of the material MR1 required for shaping two layers may be calculated, or a process of shaping one layer may be divided into a plurality of processes, and the amount of the material MR1 required for one process therein may be calculated.

(E-5) In the above embodiments, the material storage unit 500 includes the inclined portion 506. In contrast, for example, the material storage unit 500 may not include the inclined portion 506.

(E-6) In the above embodiments, the first reference value hs1 when the material MR1 is used is larger than the first reference value hs3 when the material MR2 having the maximum outer dimension larger than that of the material MR1 is used. In contrast, for example, the first reference value hs1 determined as an appropriate value by the experiment may be smaller than the first reference value hs3. In addition, for example, the first reference value hs1 may be smaller than the first reference value hs3 as a result of determining the first reference value hs1 in consideration of the maximum outer dimension and a shape of the material MR1 and the maximum outer dimension and a shape of the material MR2.

(E-7) In the above embodiments, the stirring mechanism 520 is provided as the impact generation unit. In contrast, for example, the impact generation unit may be a mechanism including a piston that generates vibration by applying a strike from the outside of the material storage unit 500. In addition, an air hole may be provided on a side surface of the material storage unit 500, and a mechanism for injecting air from the outside into the material storage unit 500 through the air hole may be provided as the impact generation unit.

(E-8) In the above embodiments, the material supply unit 400 includes the compressor as the material pumping mechanism 415. In contrast, for example, as the material pumping mechanism 415, a suction pump may be provided in the material storage unit 500.

(E-9) In the above embodiments, the control unit 700 controls the material pumping mechanism 415. In contrast, for example, a control unit separate from the control unit 700 may be provided in the material supply unit 400, and the control unit may control the material pumping mechanism 415. In this case, the control unit provided in the material supply unit 400 can start, and stop, the operation of the material pumping mechanism 415 and adjust the output thereof.

(E-10) In the above embodiments, the receiving-side coupling portion 530 is positioned above the supply-side coupling portion 410. In contrast, the receiving-side coupling portion 530 may be positioned below the supply-side coupling portion 410, or the receiving-side coupling portion 530 and the supply-side coupling portion 410 may be positioned at the same height.

(E-11) In the above embodiments, the material supply pipe 420 is provided. In contrast, the material supply pipe 420 may not be provided. For example, when the material supply unit 400 is positioned above the material storage unit 500, the material MR1 may be dropped from a lower portion of the material supply unit 400 to the material storage unit 500 to supply the material MR1. Further, in this case, the material pumping mechanism 415 may not be provided.

F. Other Aspects

The present disclosure is not limited to the embodiments described above, and can be implemented in various forms without departing from the scope of the present disclosure. For example, the present disclosure can be implemented as the following forms. In order to solve some or all of the problems described in the present disclosure, or to achieve some or all of the effects of the present disclosure, technical features of the embodiments described above corresponding to technical features to be described below of the embodiments can be replaced or combined as appropriate. In addition, unless described as essential in this description, the technical features can be deleted as appropriate.

(1) According to a first aspect of the present disclosure, a three-dimensional shaping device is provided. The three-dimensional shaping device includes: a material storage unit including a cylindrical body portion and a mouth portion which is provided below the body portion and which has a hole with a diameter smaller than a maximum inner diameter of the body portion, and configured to store a material in a form of pellet; a material supply unit configured to supply the material to the body portion of the material storage unit; a melting unit configured to melt the material supplied through the mouth portion of the material storage unit to form a shaping material; a nozzle configured to discharge the shaping material toward a stage; a remaining state detection unit configured to detect a remaining state of the material stored in the material storage unit; a remaining amount determination unit configured to determine whether a remaining amount of the material stored in the material storage unit is less than a first reference value based on the remaining state; and a control unit configured to control, when the remaining amount is less than the first reference value, the material supply unit to supply the material to the material storage unit until the remaining amount is equal to or larger than the first reference value, in which the first reference value is determined as a value at which a height of the material stored in the material storage unit when the remaining amount is equal to the first reference value is less than a height of an upper end of the body portion.

According to such an aspect, an amount of the material remaining in the material storage unit during shaping is reduced, and generation of a bridge in the material storage unit can be prevented.

(2) In the three-dimensional shaping device of the above aspect, at least a part of the material storage unit may be transparent, and the remaining state detection unit may be an optical sensor configured to optically detect the remaining state from an outside of the material storage unit via a transparent portion of the material storage unit. According to such an aspect, the remaining state can be detected without disturbing a flow of the material from an inside of the material storage unit to the melting unit. Accordingly, the generation of the bridge in the material storage unit can be prevented.

(3) In the three-dimensional shaping device of the above aspect, when the remaining amount is less than the first reference value, the control unit may control the material supply unit to supply the material to the material storage unit until the remaining amount is equal to or larger than a second reference value, which is larger than the first reference value, and the second reference value may be determined as a value at which a height of the material stored in the material storage unit when the remaining amount is equal to the second reference value is less than the height of the upper end of the body portion. According to such an aspect, it is possible to maintain a state where the material storage unit is not filled with the material during the shaping.

(4) In the three-dimensional shaping device of the above aspect, the material storage unit may include an inclined portion whose inner diameter decreases from the body portion toward the mouth portion. According to such an aspect, stagnation of the material in a vicinity of an upper end of the mouth portion can be prevented.

(5) In the three-dimensional shaping device of the above aspect, the first reference value when a first material is used as the material may be larger than the first reference value when a second material having a maximum outer dimension larger than that of the first material is used as the material. According to such an aspect, an amount of the second material remaining in the material storage unit during the shaping is smaller than in the case of using the first material, and even when the second material having the maximum outer dimension larger than that of the first material is used, the generation of the bridge in the material storage unit can be prevented.

(6) In the three-dimensional shaping device of the above aspect, the first reference value may be determined as a value at which the height of the material stored in the material storage unit when the remaining amount is equal to the first reference value is less than a height of an upper end of the mouth portion. According to such an aspect, the generation of the bridge in the vicinity of the upper end of the mouth portion can be prevented.

(7) The three-dimensional shaping device according to the above aspect may further include an impact generation unit configured to apply an impact to the material stored in the material storage unit. According to such an aspect, it is possible to prevent interference between materials by applying the impact to the material in the material storage unit 500.

(8) The three-dimensional shaping device of the above aspect may further include a material supply pipe coupling the material supply unit and the material storage unit; a supply-side coupling portion provided in the material supply unit and coupling to the material supply pipe; a receiving-side coupling portion provided in the material storage unit and coupling to the material supply pipe; and a material pumping mechanism configured to pump the material from the material supply unit to the material storage unit via the material supply pipe, in which the receiving-side coupling portion may be positioned above the supply-side coupling portion. According to such an aspect, when the material pumping mechanism is stopped, the material in the material supply pipe is more likely to move to the material supply unit than to the material storage unit, and excessive supply of the material to the material storage unit can be prevented.

(9) According to a second aspect of the present disclosure, an injection molding device is provided. The injection molding device includes: a material storage unit including a cylindrical body portion and a mouth portion which is provided below the body portion and which has a hole with a diameter smaller than a maximum inner diameter of the body portion, and configured to store a material in a form of pellet; a material supply unit configured to supply the material to the body portion of the material storage unit; a melting unit configured to melt the material supplied through the mouth portion of the material storage unit to form a shaping material; a nozzle configured to inject the shaping material into a mold; a remaining state detection unit configured to detect a remaining state of the material stored in the material storage unit; a remaining amount determination unit configured to determine whether a remaining amount of the material stored in the material storage unit is less than a first reference value based on the remaining state; and a control unit configured to control, when the remaining amount is less than the first reference value, the material supply unit to supply the material to the material storage unit until the remaining amount is equal to or larger than the first reference value.

According to such an aspect, an amount of the material remaining in the material storage unit during shaping is reduced, and generation of a bridge in the material storage unit can be prevented. The present disclosure is not limited to the three-dimensional shaping device and the injection molding device described above, but can be implemented in various modes. For example, the present disclosure can be implemented in an aspect of a method for shaping a three-dimensional shaped object, a method for controlling a three-dimensional shaping device, a computer program for shaping a three-dimensional shaped object, and a non-transitory tangible recording medium in which the computer program is recorded.

What is claimed is:
1. A three-dimensional shaping device comprising:
a material storage unit including a cylindrical body portion, a stirring mechanism disposed within the cylindrical body, a mouth portion which is provided below the body portion and which has a hole with a first diameter smaller than a maximum inner diameter of the body portion, and configured to store a material in a form of pellet, and an inclined portion whose inner diameter decreases from the body portion toward the mouth portion, the stirring mechanism comprising a shaft off-axis from a central longitudinal axis of the cylindrical body and a blade disposed at the lower end of the shaft;

a material supply unit configured to supply the material to the body portion of the material storage unit;

a melting unit configured to melt the material supplied through the mouth portion of the material storage unit to form a shaping material;

a nozzle configured to discharge the shaping material toward a stage;

a remaining state detection unit configured to detect a remaining state of the material stored in the material storage unit;

a remaining amount determination unit configured to determine whether a remaining amount of the material stored in the material storage unit is less than a first reference value based on the remaining state; and a control unit configured to control, when the remaining amount is less than the first reference value, the material supply unit to supply the material to the material storage unit until the remaining amount is larger than the first reference value, wherein the first reference value is determined as a value at which a height of the material stored in the material storage unit when the remaining amount is equal to the first reference value is less than a height of an upper end of the mouth portion, the hole of the mouth portion has the first diameter from the upper end of the mouth portion to a lower end of the mouth portion adjacent the melting unit, when the remaining amount is less than the first reference value, the control unit controls the material supply unit to supply the material to the material storage unit until the remaining amount is equal to or larger than a second reference value, which is different from and larger than the first reference value, and the second reference value is determined as a value at which a height of the material stored in the material storage unit when the remaining amount is equal to the second reference value is less than the height of the upper end of the body portion and more than the first reference value.

2. The three-dimensional shaping device according to claim 1, wherein at least a part of the material storage unit is transparent, and the remaining state detection unit is an optical sensor configured to optically detect the remaining state from an outside of the material storage unit via a transparent portion of the material storage unit.

3. The three-dimensional shaping device according to claim 1, wherein the first reference value when a first material is used as the material is larger than the first reference value when a second material having a maximum outer dimension larger than that of the first material is used as the material.

4. The three-dimensional shaping device according to claim 1, further comprising:

an impact generation unit configured to apply an impact to the material stored in the material storage unit.

5. The three-dimensional shaping device according to claim 1, further comprising:

a material supply pipe coupling the material supply unit and the material storage unit;

a supply-side coupling portion provided in the material supply unit and coupling to the material supply pipe;

a receiving-side coupling portion provided in the material storage unit and coupling to the material supply pipe; and a material pumping mechanism configured to pump the material from the material supply unit to the material storage unit via the material supply pipe, wherein the receiving-side coupling portion is positioned above the supply-side coupling portion.

* * * * *